United States Patent [19]

Boucher

[11] Patent Number: 4,701,238

[45] Date of Patent: Oct. 20, 1987

[54] WRAPPING MACHINE

[75] Inventor: Ronald H. Boucher, Manchester, N.H.

[73] Assignee: Crathern Engineering Co., Inc., Contoocook, N.H.

[21] Appl. No.: 923,679

[22] Filed: Oct. 27, 1986

[51] Int. Cl.[4] .................................................. B32B 3/04

[52] U.S. Cl. .................................... 156/479; 156/216; 156/486

[58] Field of Search ............... 156/486, 492, 479, 480, 156/216, 477.1, 475

[56] References Cited

U.S. PATENT DOCUMENTS

| | | | |
|---|---|---|---|
| 720,081 | 2/1903 | Taylor | 156/480 |
| 1,776,426 | 9/1930 | Glass | 156/480 |
| 1,833,702 | 11/1931 | Anthony | 156/480 |
| 4,111,739 | 9/1978 | De Bin et al. | 156/486 |

*Primary Examiner*—David Simmons
*Attorney, Agent, or Firm*—Schiller, Pandiscio & Kusmer

[57] ABSTRACT

Apparatus is adapted to automatically fold and secure the edges and corners of a relatively flexible, larger sheets over the corresponding edges and rounded corners of at least one relatively rigid, smaller blank so as to substantially maintain the contour of the corners.

27 Claims, 26 Drawing Figures

Fig_8
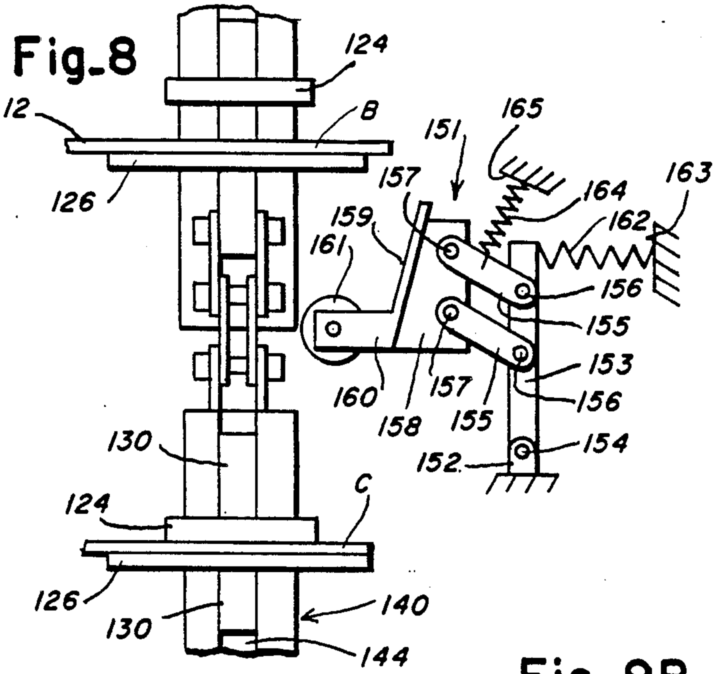
Fig_9A
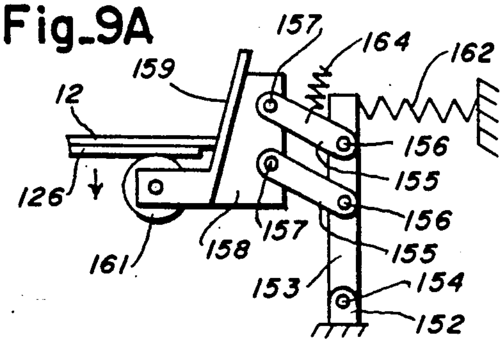
Fig_9B
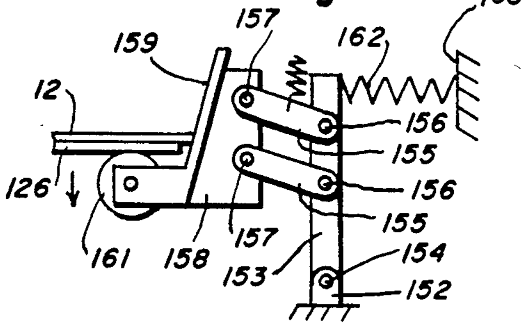
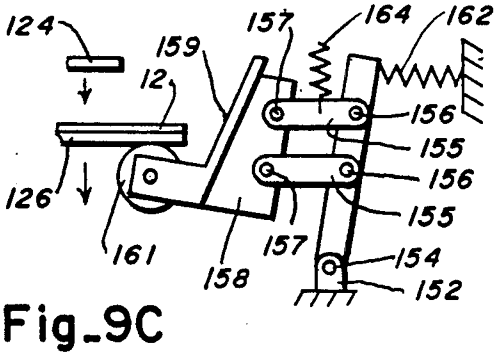
Fig_9C
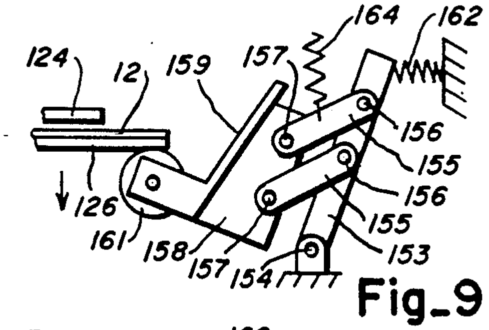
Fig_9D
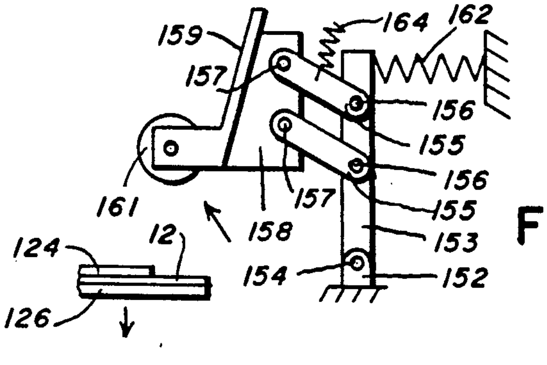
Fig_9E Fig_14A
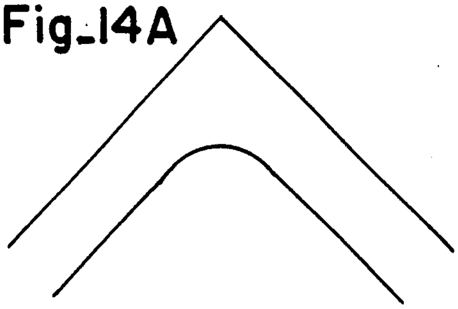
Fig_14B
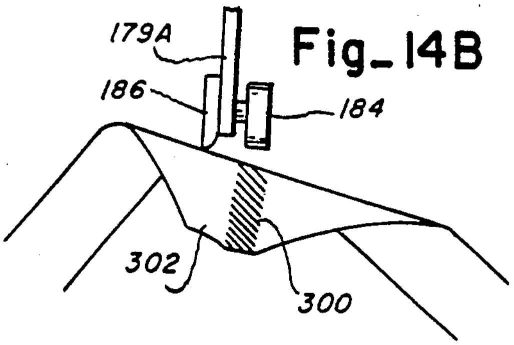
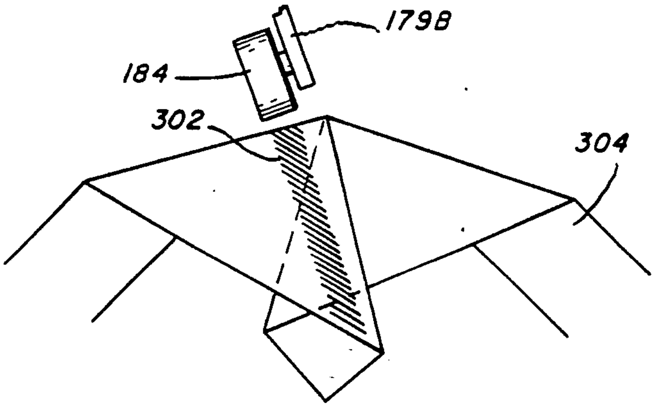
Fig_14C
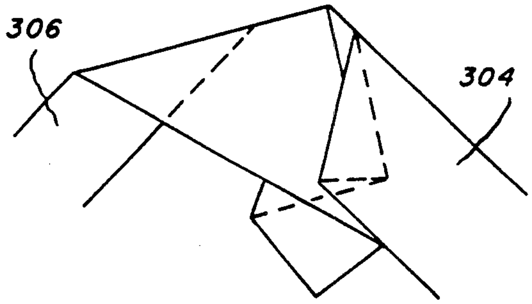
Fig_14D
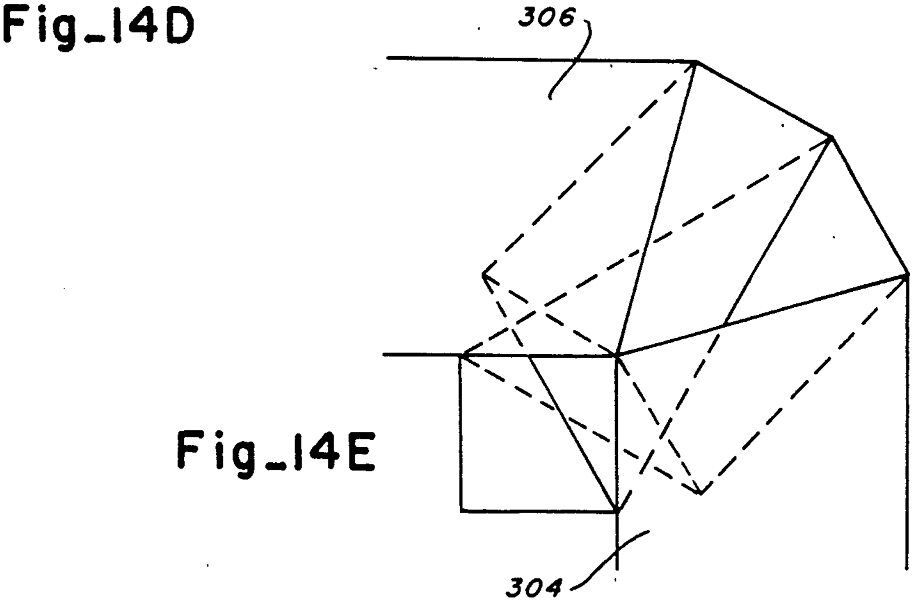
Fig_14E

WRAPPING MACHINE

The present invention relates generally to apparatus for securing the edges and corners of a relatively flexible "wrapper" over the respective edges and corners of a relatively stiff "blank" secured to one side of the wrapper; and more particularly, to such edge and corner wrapping apparatus wherein the wrapper is neatly folded over rounded corners of the blank so that the contour of the rounded corners of the blank are substantially maintained in the finished product.

Various apparatus are commercially available for making two piece laminated products, such as game boards, each having a relatively stiff backing sheet member, often referred to as a "blank", secured by adhesive to one side of a relatively flexible, cover sheet, usually called a "wrapper". These devices have been expanded to laminate two blanks side by side, to a single wrapper, when making, for example, record jackets, and to laminate three blanks to a single wrapper, such as when making book cases. See, for example, U.S. Pat. Nos. 3,400,031; 3,522,129; 4,336,094 and 4,345,960, all assigned to the present assignee. In all of these applications the wrapper is often provided with printed information on one of its sides opposite the adhesive-coated side to which the blank(s) are secured. Accordingly, the devices in U.S. Pat. Nos. 3,400,031; 3,522,129; 4,336,094 and 4,345,960 align the wrapper with the blank(s) before the blank(s) are secured to the wrapper.

The wrapper is usually made larger than the blank(s) secured to them so that when the blank(s) are brought into contact with and secured to the side of the wrapper provided with the adhesive, the edges of the wrapper extend beyond the edges of the blank(s). The edges and corners of the wrapper are subsequently wrapped around and secured to the corresponding edges and corners of the blank(s) so that the finished product has finished edges and corners.

Wrapper machines have been developed for wrapping the extended edges and corners of the wrapper over the corresponding edges and corners of the blank(s). One such machine is manufactured and sold by Crathern Engineering Co., Inc., of Contoocook, N.H., the present assignee, as the 4FW-2 Wrapper. Another, is shown and described in U.S. Pat. No. 4,111,739. These machines are designed for and work well in securing the extended squared corners of the wrapper around the squared corners of blank(s). There has recently been a demand, however, to make such laminate products with rounded corners, as for example, book cases used for retaining computer software manuals, and the like.

One commercially-available round corner wrapping machine wraps each corner of the wrapper around the corresponding rounded corner of the blank in such a manner that squeezes the folded material of the wrapper together providing a wrinkled, unsightly bunching of material at the inside corners of the finished laminate. While a neatly folded rounded corner can be achieved by folding the wrapper by hand in a series of folds so as to provide a more neatly tucked corner, such an approach is clearly labor intensive and accordingly an expensive and inefficient manufacturing process.

It is therefore an object of the present invention to provide an improved system which substantially reduces or overcomes the above-mentioned problems of the prior art.

A more specific object of the present invention is to provide an improved system for tucking the edges and corners of a wrapper in a folded pattern around the corresponding edges and rounded corners of blank(s) secured to the wrapper in a neater fashion than achieved by the above described round corner wrapping machine, and in a more efficient and inexpensive manner than heretofore achieved by the hand assembly technique.

These and other objects are achieved by an improved apparatus. The apparatus is adapted to fold and secure the edges and corners of a relatively flexible, larger sheet over the corresponding edges and corners of at least one relatively rigid, smaller blank so as to substantially maintain the contour of the corners. The blank is of the type that includes at least one rounded corner. The apparatus comprises:

means for transporting the sheet and blank to a work station, wherein the sheet and blank are positioned, as the laminate, at the work station;

means for folding and securing a first portion of the part of the sheet over the edge of the blank near the rounded corner, while lifting a second portion of the part of the sheet adjacent the first portion so as keep the second portion from contacting the blank;

means for folding and securing the second portion of the part of the sheet over the corresponding portion of the edge of the blank near the rounded corner so that a part of the second portion covers at least a part of the first portion; and means for folding the remaining portions of the edges of the sheet over the corresponding edges of the blank.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompaning drawings wherein:

FIG. 8 is a side view, partially cut away and partially in schematic form, illustrating a detailed portion of the articulating mechanism for properly positioning the laminate before clamping the laminate between the clamps of the respective vertically driven carrier chain drives;

FIGS. 9A–9E show the sequence of operation of the articulating mechanism shown in FIG. 8;

Figure 1:
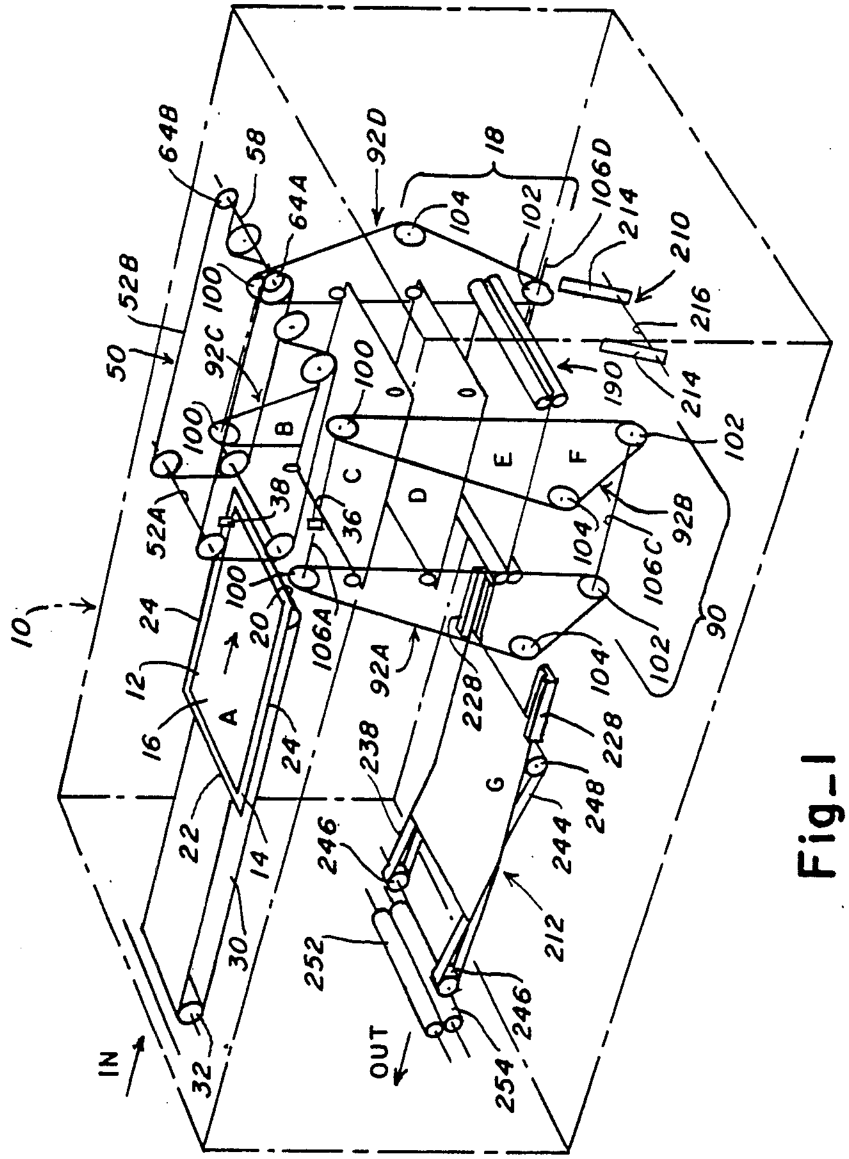
FIG. 1 is a schematic, perspective view of the preferred system of the present invention.

FIGS. 13A–13E are perspective views of the various parts of the FIG. 1 system interacting with a laminate showing the sequence in which the portions of the wrapper extending beyond the edges of the blanks are systematically folded and tucked around the rounded corners and edges of the blank of the laminate; and FIGS. 14A–14E show top views of the laminate as it is carried through the sequence of steps shown in FIGS. 13A–13E.

Referring to FIG. 1, the preferred system of the present invention, generally indicated at 10, is designed to receive a laminate 12 including at least one blank 16 adhesively secured to one side of the wrapper 14. The laminate 12 can be provided, for example, by any of the registration and laminating systems known in the art, depending upon the final application of the laminate. A specific registration and laminating system is not shown in the accompaning drawings, but several are depicted in U.S. Pat. Nos. 3,400,031; 3,533,129; 4,336,094 and 4,345,960 or by the "FB–1 Spotter", manufactured by Crathern Engineering Co., Inc. of Contoocook, NH, the present assignee. Generally, the laminate 12 is created by these systems by initially moving the wrapper 14, with an exposed coating of adhesive on its upper side (and typically having printed matter on its lower side), along a conveyer belt to a position below a carriage. The carriage carries one or more blanks 16 and is designed to register itself relative to one or two edges of the wrapper 14 before the blank(s) are brought into contact with the wrapper 14. The latter is larger both in its width and length dimensions than the corresponding dimensions of the blank(s) secured to the wrapper. The system 10 is shown for use with a laminate comprising a single blank although it will be obvious that the system can be easily modified to be used with laminates having two or more blanks. Preferably, when the laminate 12 enters the system 10, the wrapper sheet is on the bottom, and the blank on top, with edge strips of the wrapper, and the corresponding adhesive layer on the strips, extending beyond and around the entire perimeter of the blank. The exposed upper side edge portions of these strips of the wrapper and associated layer of adhesive are provided so that the edges of the wrapper can be wrapped around the corresponding edges of the blank. In accordance with the present invention, at least one corner, and typically all four corners of the blank are rounded, with the system 10 being designed to automatically wrap the corners of the wrapper 14 around these rounded corners of the blank 16 in a neatly folded pattern.

Generally, the preferred system 10 is designed to transport the laminate 12 through the seven positions indicated at A-G during the folding and wrapping operation, wherein :

(1) at position A, the laminate 12 is positioned to horizontally enter the first wrapping or work station, indicated generally at 18, (2) at position B, the laminate 12 is positioned to vertically travel through first wrapping station 18, (3 and 4) at positions C and D, the laminate has the corners of its wrapper folded and secured around the corresponding rounded corners of the blank, (5) at position E, the laminate has the leading and trailing edges of its wrapper folded and secured around the corresponding edges of the blank, (6) at position F, the laminate exits the wrapping station 18, and (7) at position G, the laminate has the side edges of its wrapper folded in a second wrapping or work station 228, before exiting the apparatus.

Describing the system 10 in greater detail, the laminate 12 enters system 10 with one edge of the laminate being the leading edge 20, the opposite edge the trailing edge 22, and the two side edges 24 parallel to the direction of travel. System 10 is provided with conveyor means 30 for conveying the laminate 12 in this orientation from the entrance of the system 10 to position A, where the laminate 12 is positioned to horizontally move into the wrapping station 18.

The conveyor 30 may be any type of conveyor. For example, conveyor 30 can include a single conveyer belt for transporting the laminate to the position A. Preferably, the conveyor 30 includes a pair of spaced-apart belts suitably connected to a common conveyor belt drive 32, which in turn is controlled by the control system 34, described in greater detail in connection with FIG. 12. The pair of spaced-apart belts are positioned so as to move in synchronization with one another so as to receive and carry the laminate 12 directly from the registration and laminating system to the position A in a substantially horizontal plane so as to maintain the adhesive side of the exposed edge strips of the wrapper 14 extending beyond the respective edges of the blank 16 on the topside of the laminate 12, exposed for the wrapping operation. As generally indicated in FIG. 1, and in greater detail in FIG. 2, a radiation source 36 and detector 38 are positioned to detect the leading edge 20 of the laminate 12 when the latter arrives at position A. The source and detector are preferably positioned respectively below and above one another between the two conveyer belts of conveyor 30 on opposite sides of the plane of the path of the laminate 12, as shown, so that the leading edge 20 of laminate 12 intersects a beam directed from the source 36 toward the detector 38, as the laminate 12 moves into position A. It should be appreciated, that where conveyor 30 comprises a single belt, both source and detector can be positioned above the belt each directed along a line intersecting at a point at or near the plane of the belt through which point the laminate 12 travels. In the latter configuration the detector 38 senses a change in the light reflected off the belt as the laminate intersects the light. This approach is described in greater detail in U.S. Pat. Nos. 3,400,031; 3,522,129; 4,336,094 and 4,345,960. In either configuration, detector 38 is positioned to tell the system when the laminate 12 is precisely in position A, indicating that a laminate 12 is present to commence the wrapping operation.

Figure 12:
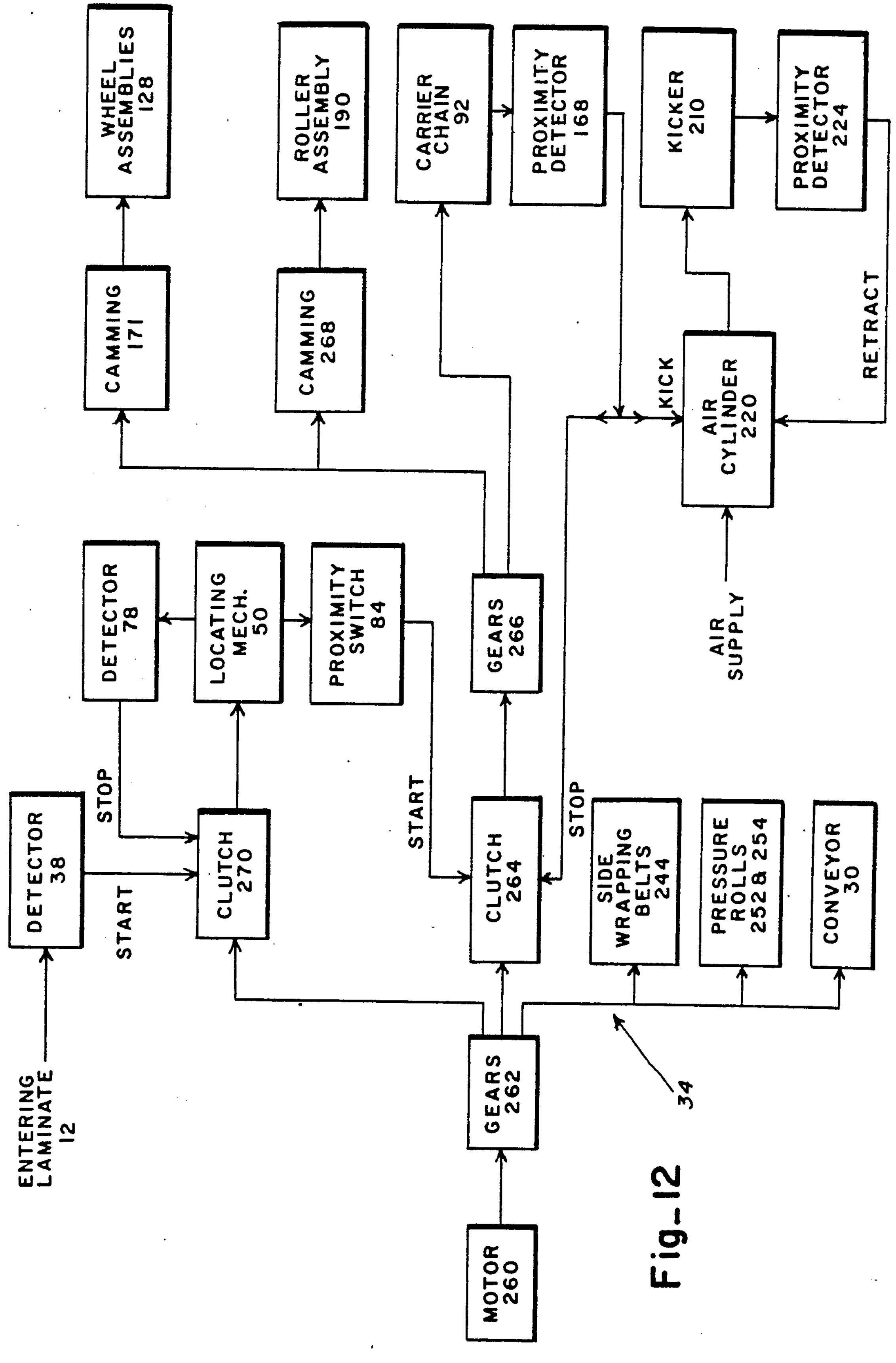
FIG. 12 is a block diagram of the control system for controlling the operation of the system of FIG. 1.

As the leading edge 20 of the laminate 12 passes through the beam of the source 36, detector 38 detects the leading edge 20 of a laminate and generates a signal to control system 34, the latter being described in greater detail in FIG. 12. The control system 34 drives the locating mechanism 50, generally shown in FIG. 1 and in greater detail in FIG. 2, which in turn pulls laminate 12 from position A, as it moves off the conveyor 30, and moves the laminate towards and holds it in position B in the wrapping station 18.

Figure 2:
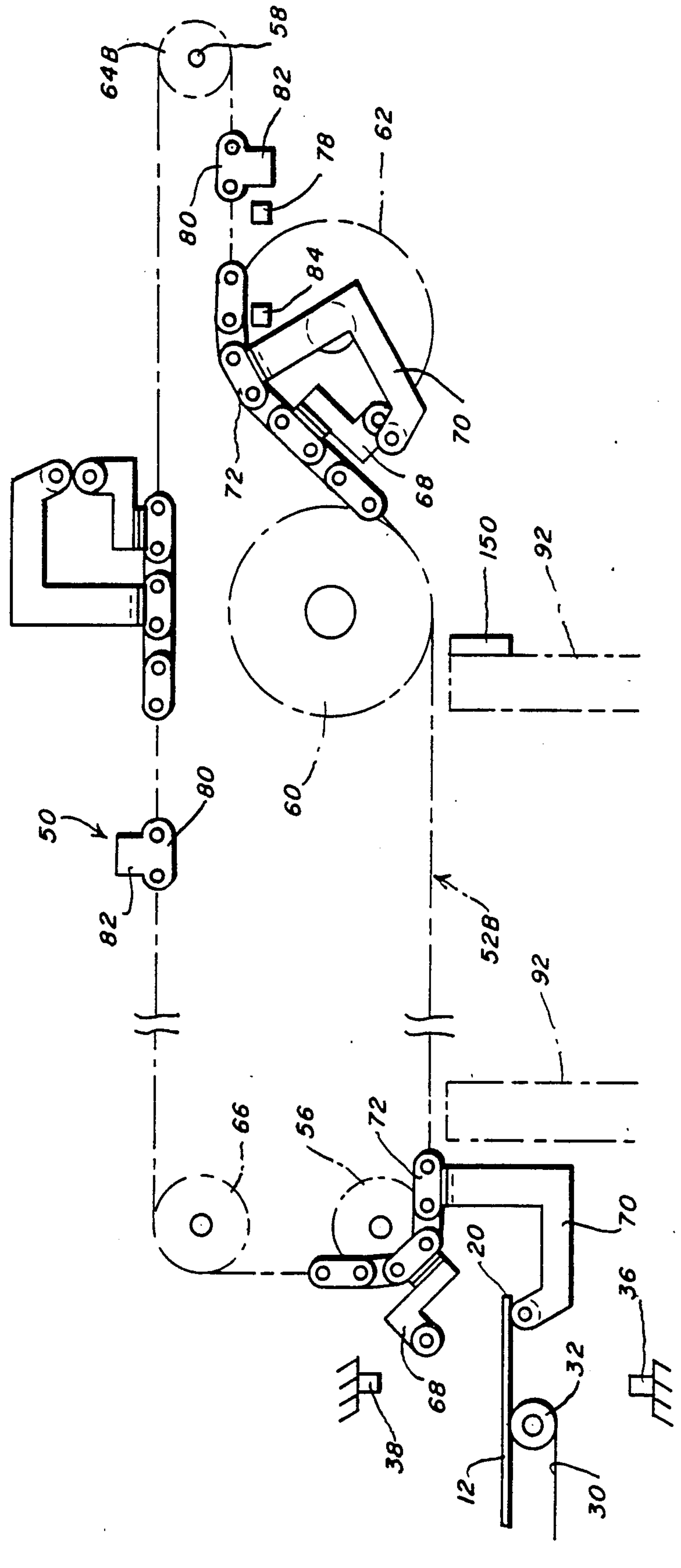
FIG. 2 is a side view, partially in schematic form, of the preferred locating mechanism of the system shown in FIG. 1, for locating the unwrapped laminate in the first position in the wrapping or work station of the FIG. 1 embodiment.

Locating mechanism 50, shown schematically in FIG. 1 and in greater detail in FIG. 2, includes a pair of horizontally driven gripper chains 52A and 52B (one being shown in FIG. 2) moved in synchronism in parallel spaced-apart planes such that the lower horizontal paths of the chains move in a plane which is parallel to and just above the plane through which the laminate 12 travels on the conveyor 30. The chains 52A and 52B are spaced apart by a distance slightly less than the width of the laminate 12 (as measured between the side edges 24), so that the laminate 12 can be gripped and pulled under the chains as the laminate is moved off the conveyor 30.

Chains 52 are preferably driven in parallel by control system 34 (shown generally in FIG. 12). As will be more evident from a description of FIG. 12, control system 34 is suitably coupled, for example, to shaft 58 (see FIG. 1). Shaft 58 drives a pair of gears 64, one for driving each of the chains 52 (see FIGS. 1 and 2). As shown in FIG. 2, chain 52 is also driven around gears 56, 60, 62 and 66, with the chain passing under gear 60, and around and over gear 62 (so as to pass therebetween) for reasons which will be more apparent hereinafter. Each chain 52 includes one or more pairs of gripping arms 68 and 70 for pulling each laminate 12 from position A to position B (in FIG. 1). Each of the gripping arms is secured to a link 72 of the chain 52 in such a way that the arms will not interfere with the links of the chain engaging the teeth of the gears 56, 60, 62, 64 and 66.

Figure 3:
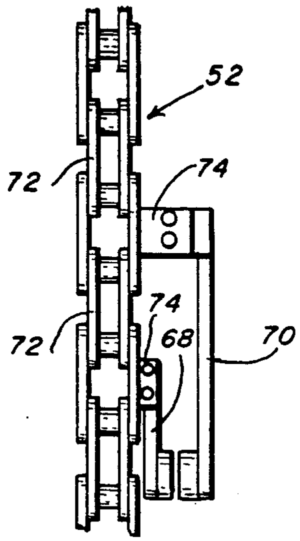
FIG. 3 is a perspective view showing the details of the gripping arms of the locating mechanism of FIG. 2.

As shown generally in FIG. 2, and in detail in FIG. 3, one end of each of the gripping arms 68 and 70 of a pair is secured to a different link 72 of the chain, preferably with at least one link disposed therebetween, so that (a) the remote ends of the arms of each pair will move apart as the chain moves around the gear 56, (b) each pair of arms is capable of gripping and holding a laminate 12 between its remote ends as the pair of arms moves horizontally from gear 56 to the gear 60, and (c) the remote ends of the pair of arms will separate (and therefore release the laminate gripped therebetween) as the pair of arms move around gear 60.

Each arm 68 and 70, as best shown in FIG. 3, is attached to an L-shaped base 74 secured to or forming a part of the inner side of the corresponding link 72 to which it is attached (i.e., the arm extends from the side of link 72 opposing the other of the chains 52), such that each arm extends from the base through a position horizontally displaced from the plane of the chain 52, inwardly toward the opposite chain, so as to (a) move freely around the gears 56, 60, 62, 64 and 66, and (b) pull laminate 12 between the two chains 52. The remote end of each of the arms 68 and 70 is provided with a contact element 76, preferably in the form of a friction element for gripping the laminate 12 securely. The arms are therefore designed so that contact elements 76 of each pair of arms 68 and 70 move away from one another (and therefore open) as the arms move around the gear 56, where the arms (a) receive a laminate 12 at position A moving off the conveyor 30 inbetween the elements 76 of the arm pair; (b) provide sufficient clamping force on opposite sides of the laminate 12 so as to pull the laminate as the chain 52 and arms 68 and 70 move from gear 56 to gear 60; and (c) open as the pair of arms 68 and 70 move around the gear 60 so as to release the laminate 12. As shown in FIG. 3, the contact element 76 of the arm 68 is preferably horizontally offset from the contact element 76 of the corresponding arm 70 of the arm pair so as to allow the two elements 76 to move past one another as the corresponding links 72, to which the pair of arms are secured, move over the gear 62.

Locating mechanism 50 is also provided with means for sensing when a pair of arms 68 and 70 move into position where the arms can receive a laminate 12 in position A, moving off the conveyor 30, between its respective contacting elements 76. The means for achieving the foregoing preferably includes a proximity detector 78 (mounted in a stationary position relative to the moving chain 52), and a reference link 80 for each corresponding pair of arms 68 and 70. Each reference link is similar to the link 72, except that the reference link also includes a protrusion 82. Each reference link 80 is positioned in the chain 52 so that the protrusion 82 of each reference link is detected by proximity detector 78 when a corresponding pair of arms 68 and 70 are in the correct position to receive a laminate 12 in position A, moving off conveyor 30. As will be evident from a description of the control system 34 (shown in FIG. 12), as each protrusion 82 of a reference link 80 moves past the proximity detector 78, the chains 52 will stop (in the position shown in FIG. 2) where a pair of arms is positioned on gear 56 and is positioned so as to receive the next laminate moving into position A. Once the laminate 12 is sensed in position A by the detector 38 the chains 52 will begin moving so that laminate 12 is gripped between the contact elements 76 of the arms of each chain 52 positioned on a corresponding gear 56 as the laminate moves off the conveyor 30, and moved by the arms horizontally into position B of the wrapping station 18. As the two pairs of arms on the two opposing gripper chains 52 move the laminate into the wrapping station 18, the laminate 12 is moved into position B where it is to be supported and moved vertically downward through the wrapping station by indexing system 90 (shown generally in FIG. 1). Indexing mechanism 90 includes at least four vertically driven, carrier chain drives 92A–92D positioned between the leading and trailing edges 20 and 22 of a laminate when the latter is located in position B. Two of the chain drives are shown in FIG. 2, in phantom, in their relative positions with respect to one of the horizontal chains 52. A second proximity detector 84 for activating the indexing mechanism, so as to move the laminate 12 vertically down through the wrapping section 18, is positioned so as to sense the protrusion 82 of the reference link 80 after the laminate has been moved into position B and released by the gripping arms 68 and 70, such that the laminate is free to move downwardly free of the arms, but before the protrusion of the link 80 is sensed by the proximity detector 78.

Figure 4:
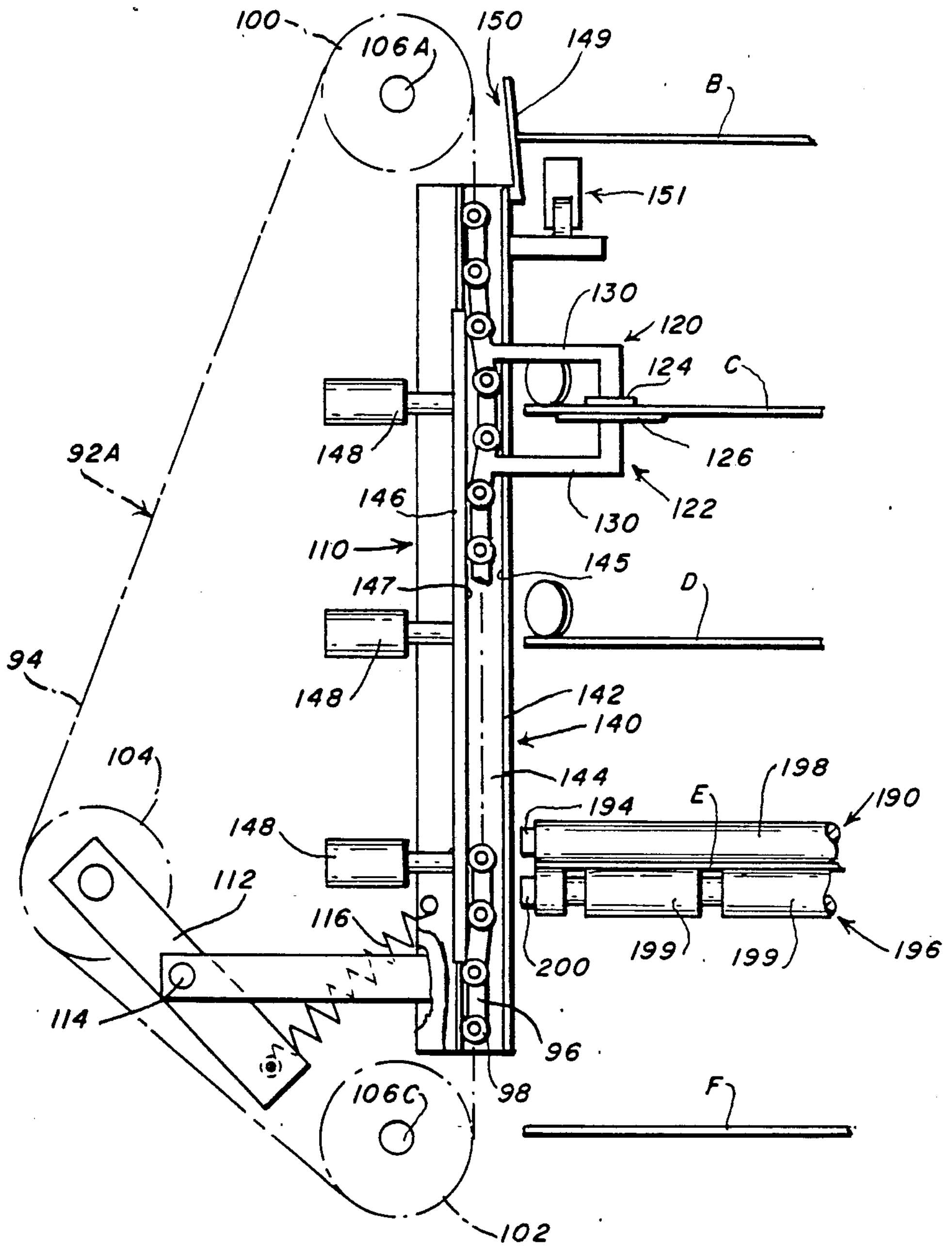
FIG. 4 is a side view, partially in schematic form, of one of the vertically driven, carrier chain drives of the indexing system of the system shown in FIG. 1, for moving the laminate through the first wrapping or work station of the system.
Figure 5:
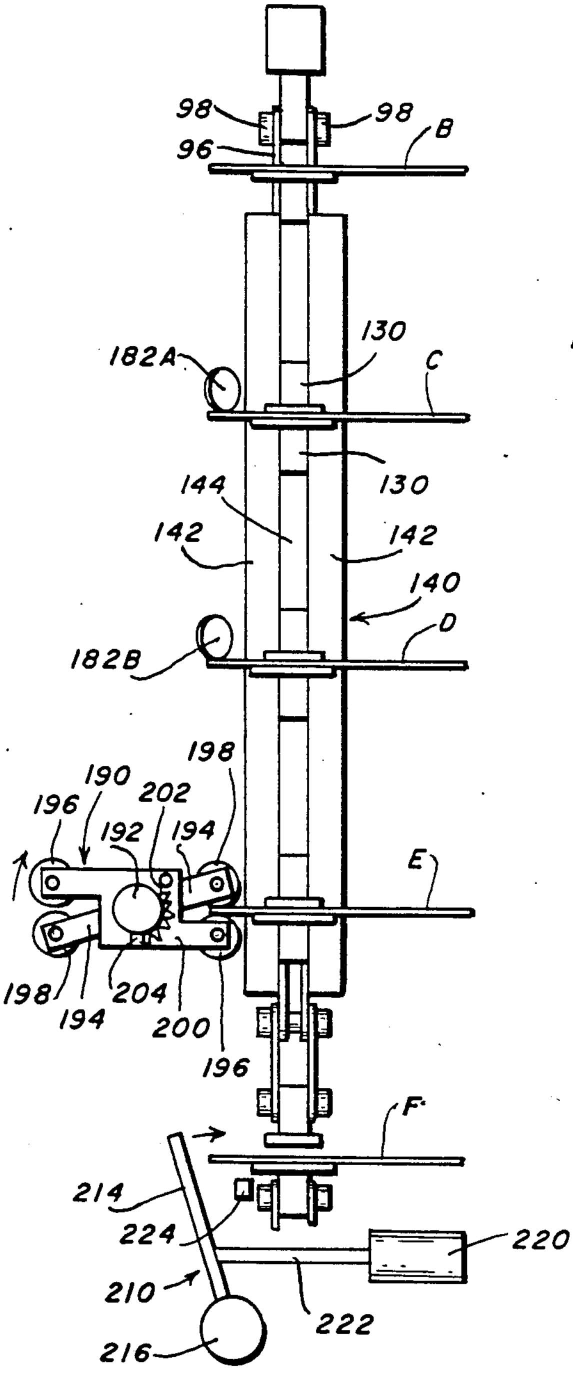
FIG. 5 is a front view of the chain drive shown in FIG. 4.

Referring to FIGS. 4 and 5, each carrier chain drive 92 includes a chain 94, movable within a vertical plane, with the vertical planes of the chains of drives 92A and 92C (as shown in FIG. 1) being coplanar, and those of the chains of drives 92B and 92D (as shown in FIG. 1) being coplanar and parallel to the planes of chains of drives 92A and 92C. Referring again to FIGS. 4 and 5 each chain 94 includes individual links 96, connected together with pivot pins each including a pair of rollers 98 mounted on the pins respectively on opposite sides of the chain for reasons which will be described hereafter. Indexing mechanism 90 includes means for moving the chains in synchronism, such that the vertical path of each chain moves directly down adjacent the positions B-F, with the vertical paths of chains 92A and 92B lying in one vertical plane parallel to the movement of the adjacent side edge 24 of the laminate, as the latter moves through positions B-F. Similarly, the vertical paths of chains 92C and 92D lie in a second vertical plane parallel to the movement of the adjacent side edge 24 of the laminate. Preferably, the means for moving the chains in synchronism includes at least three gears 100, 102 and 104 for engaging the means for a corresponding chain, one of the gears preferably being driven by the control system 34 shown in FIG. 12. As shown in FIG. 1, the top gears 100 of drives 92A and 92B are coupled by the shaft 106A, and the bottom gears 102 of drives 92A and 92B are coupled by the shaft 106C. Gears 100 and 102 of drives 92C and 92D are similarly coupled through similar shafts. Thus, by driving, for example, shafts 106A and 106B, all of the chains 94 will move in synchronism.

Referring to FIG. 4, each chain drive 92 includes a support 110. Support 110 includes means (not specifically shown) for supporting the upper and lower gears 100 and 102 so that the chain 94 moves around the gears 100, 102 and 104 (in a clockwise direction as shown in FIG. 4).

The support 110 of each drive 92 also includes means for supporting gear 104 over which the respective chain 94 moves. Means are preferably provided for tensioning the chain on the gears 100, 102 and 104. Specifically, the gear 104 is preferably mounted on one end of a pivotal arm 112, the latter being pivotably supported approximately at its center at point 114 by the support 110. The opposite end of arm 112 is secured to one end of a tensioning spring 116, with the other end of the spring being attached to the support 110 so that the spring, which is under tension, pulls the arm 112 so as to move the gear so that the chain is tensioned on the gears 100, 102 and 104.

The vertically driven drive 92 includes one, and preferably a plurality of pairs of carrier clamp connectors 120 and 122 each secured at one of its ends to the chain 94, and respectively supporting the upper and lower clamps 124 and 126 at their opposing ends. Preferably, each of the connectors 120 and 122 is secured to a link 96 of the chain 94 in a manner so that the connectors will not interfere with the links as the latter engage the teeth of each of the gears 100, 102 and 104, nor will the connectors and clamps interfere with the horizontally-driven chains 52 as the connectors and clamps travel around the upper gear 100.

As shown in detail in FIGS. 4 and 5, each connector 120 and 122 of a pair is secured to a different link 96, preferably with one link disposed therebetween, so that each pair of clamps 124 and 126 of each pair (1) will spread as the chain moves around each of the upper gears 100, without interferring with chain 52; (2) is capable of receiving a laminate 12 between the two clamps as (a) the corresponding connectors 120 and 122 move around the upper gear 100, and (b) the gripper arms 68 and 70 move a laminate 12 into position B of the wrapping station 18; (3) will grip a laminate 12 and hold it in horizontal, parallel planes in each of the position B-F as the pair of connectors 120 and 122 and corresponding clamps 124 and 126 move vertically down from gear 100 to the gear 102; and (4) is adapted to separate (and therefore release the laminate gripped therebetween) as the pair of connectors 120 and 122 move onto lower gear 102 when the laminate is moved into position F of the wrapping station 18. Preferably, the pairs of clamps 124 and 126 are spaced equidistant along the chain 94 so that a laminate can be positioned in each of the positions B-F at the same time.

Each connector 120 and 122 includes an extension arm 130 connected at one end to the link 96 and at the other end to the corresponding clamp 124 or 126. Each extension arm has a horizontal thickness less than the thickness of the chain 94 for reasons which will become more apparent hereinafter. The upper clamp 124 preferably includes a relatively small contact area, while lower clamp 126 preferably includes a relatively large contact area for contacting the respective top and bottom surfaces of the laminate 12, when the latter is supported therebetween. The clamps are located so that they contact and support the laminate 12 clear of the corners and the exposed wrapper edges of the laminate when the latter is supported therebetween so as not to interfere with the wrapping operation at locations B-F in the wrapping station 18.

Figure 6:
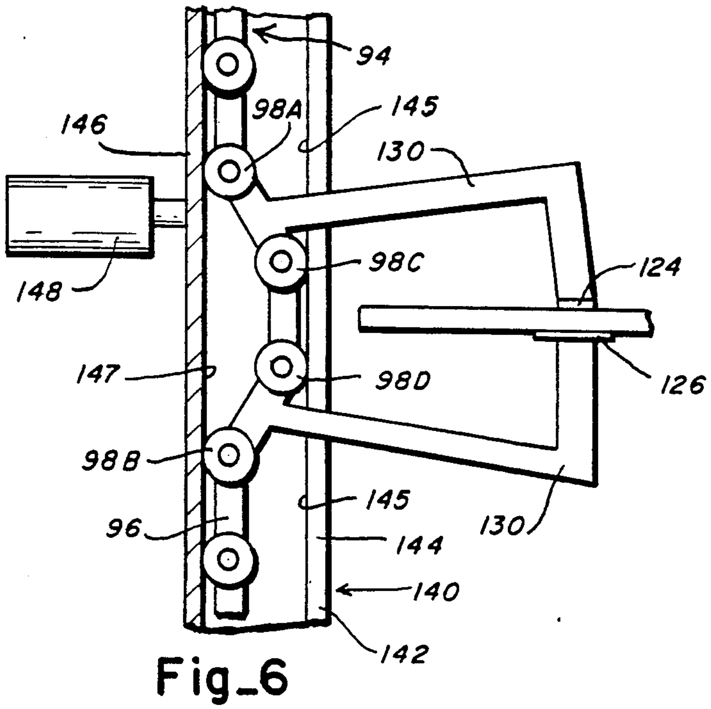
FIG. 6 is a detailed view, partially in schematic form and partially cutaway, of the elements of a vertically driven carrier chain drive for varying the clamping force exerted on a laminate held between each pair of clamps of the drive, wherein the angles between the links of the chain section shown have been exaggerated for exposition purposes only.

Means, shown in FIGS. 4 and 5, and in greater detail in FIG. 6, are preferably provided for varying the clamping force exerted between each pair of clamps 124 and 126 so as to accommodate laminates of different thicknesses. More specifically, support 110 of each chain drive 92 includes a chain drive guide 140 shown in FIGS. 4, 5 and 6. The guide 140 includes a pair of L-shaped vertically-extending brackets 142, spaced apart so as to provide a front vertical slot 144 and inside contact surfaces 145 to each side of the slot. The slot is dimensioned so as to be wider than the thickness of each extension arm 130, but narrower than the chain 94, so that each arm is adapted to freely move through slot 144 as the chain moves from the upper gear 100 to the lower gear 102 of the chain drive 92. The rear of the guide 140 is provided with a rear plate 146 (see FIGS. 4 and 6) having a contact surface 147 behind the portion of the chain between gears 100 and 102 and movable toward the slot 144 by the activation of the air cylinders 148. As shown in FIG. 6, each pair of rollers 98C and 98D are adapted to rotate against the contact surfaces 145 of the respective L-shaped brackets 142. Similarly, each pair of rollers 98A and 98B are adaptd to rotate against the surface 147 of the rear plate 146 as the chain moves through the guide 140. In order to effectively control the pressure between the clamps 124 and 126, the connectors 120 and 122 are secured to the chain 94 in such a way that maximum pressure is applied between the clamps when maximum pressure is applied by air cylinders 148. The adjoining links 96 of the chain 94 which support the connectors are never perfectly aligned. The presence of a laminate 12 in between clamps 124 and 126 spreads the clamps apart, thereby causing rollers 98A and 98B to press against surface 147 of plate 146. Rollers 98C and 98D always roll against surfaces 145 of L-shaped bracket 142. The motion of plate 146 is restricted such that the minimum space between surfaces 145 and surface 147 is slightly more than the diameters of each of the rollers 98. In their relaxed state, therefore, these links will be at greater angles to one another than when pressed between the surfaces 145 and surface 147 (as for example, by providing some slack in the portion of the chain 94 between gears 100 and 102), so that as the rollers 98 pass through the guide 140, the opposing pressure exerted (by air cylinders 148) on the rollers of adjacent links (as indicated by the arrows in FIG. 6) between the surface 147 of the rear plate and the surfaces 145 of each of the L-shaped brackets 142, tends to straighten the adjacent links 96 and therefore provide greater gripping pressure between the clamps 124 and 126 of each pair.

Figure 7:
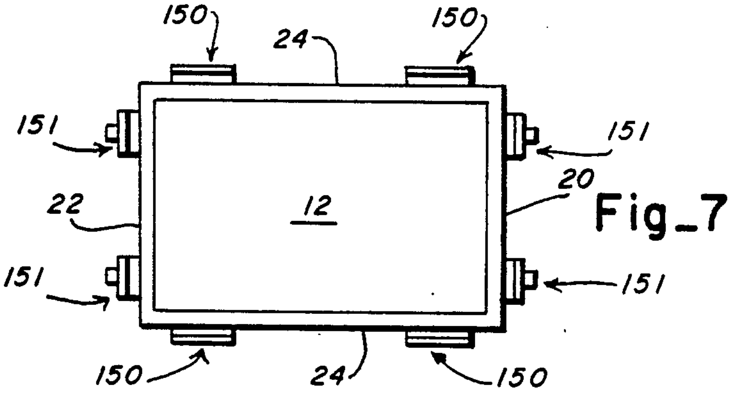
FIG. 7 is a top schematic view of the components of the apparatus for properly positioning the laminate in place before the laminate is moved through the first wrapping section of the system of FIG. 1.

The wrapping station 18 also includes means for properly orienting the laminate 12 as it moves into position B between the pair of clamps 124 and 126 at the top of indexing mechanism 90 so that the edges of the laminate are properly positioned for the corner and edge folding operations. As shown in FIG. 7, preferably, the articulating means comprises (1) guides 150 provided with guide surfaces (one supported by each carrier chain drive as best shown in FIG. 4) for interacting with the side edges 24 of the laminate, and (2) edge locating articulating devices 151 (one supported by each carrier chain drive as best shown in FIG. 4) for interacting with the leading and trailing edges 20 and 22 of the laminate 12, as the laminate, supported by lower clamps 126, moves from position B to position C and the upper clamps 124 move into contact with and hold the laminate between these upper clamps and the corresponding lower clamps 126.

The guides 150 are slightly inclined so that the spacing between the opposing guide surfaces 149 of the opposing drives 92 on opposite sides of the path of the laminate at position B narrows from the top of the guide surfaces to the bottom, where the clamps begin to firmly grip the laminate, as the laminate is moved from the position B to position C. As will be more evident hereinafter, the spacings between opposing guide surfaces 149 of the guides 150 (between drives 92A and 92C and between 92B and 92D) are adjusted so that the relative spacings at the bottom of the opposing guide surfaces are each substantially the same dimension as the width of the laminate 12 so as to insure that the side edges of the laminate are precisely positioned before the laminate is firmly secured between the clamps 124 and 126.

The edge locating articulating devices 151, one being shown in greater detail in FIG. 8, each comprises a support 152 suitably fixed relative to the support 110 of the respective chain drive. A vertical link 153 is pivotally connected to support 152 at pivot pin 154. A pair of parallel links 155 are pivotally secured, each at one end, to the vertical link 153 at pivot pins 156, both pivot pins 156 spaced from pivot pin 154 and from each other. The opposite ends of the parallel links 155 are pivotally secured at pivot pins 157 to the guide element 158. The latter is provided with vertically inclined surface 159, a horizontal portion 160 extending horizontally from the bottom of the inclined surface 159 and contact roller 161, rotatably supported directly below the clamp 126 at the end of the horizontal portion 160 of the device 151. A first spring 162 is connected between the vertical link 153 and a support 163 for biasing the vertical link (and therefore the guide element 158) away from the laminate 12, and a second spring 164 is connected between the guide element and fixed support 165 for biasing the guide element up and away from the laminate.

Generally, as best shown in the sequence of FIGS. 9A–9E, as the laminate is released in position B and the proximity detector 84 senses the protrusion 82 of the reference link 80, the chains 94 of the respective drives 92 will begin to move. Initially, the laminate will rest on a lower clamp 126 of each of the drives 92, the upper clamp being spaced from the upper surface of the laminate. As the chain moves the lower clamp 124 of each drive 92 will come into contact with the roller 161 as shown in FIG. 9A. The roller 161 and guide surface 159 begin to move in a direction controlled by the links 153 and 155 and the pivots pins 154, 156 and 157 against the bias of spring 164. The geometry of the mechanism is designed such that as the mechanism moves the guide element 158 will move down, but will not rotate relative to the laminate. The motion of the guide element 158 relative to the lower clamp 126 is such that the guide element 158 initially moves horizontally toward the clamp 146 as the guide element 158 moves down. As the guide element 158 moves down the guide surface 159 will move toward and contact the opposing edge (20 or 22) of the laminate, as shown in FIG. 9B. The guide surface 159 will move horizontally toward the edge of the laminate until the parallel links 155 are oriented in a horizontal orientation (See FIG. 9C). If the guide surface contacts the edge of the laminate before the mechanism reaches the position shown in FIG. 9C, the guide element will actually move the laminate horizontally until the mechanism of FIG. 9C is reached. Thereafter, the parallel links 155 begin to rotate past their horizontal orientations such that the guide element 158 begins to move horizontally relative to the laminate away from the laminate as shown in FIG. 9D, as the laminate is moved downwardly. Simultaneously, the spring 162 begins to compress, and the spring 164 continues to be stretched under tension. At this point the clamps 124 and 126 begin to grip and hold the laminate and the guide element moves sufficiently in a horizontal direction away from the laminate so that the roller 161 rolls over the edge of the lower clamp 124 and the laminate 12 as the laminate moves past the mechanism. The mechanism will return to its original position because of the action of the extension spring 164 as shown in FIG. 9E. The laminate will thus be properly positioned for the subsequent operations in station 18. It should be appreciated that the guides 150 and devices 151 can be spaced sufficiently so as to bend the exposed edges of the wrapper toward the top surface of the blank so as to facilitate the subsequent folding operations.

Figure 10:
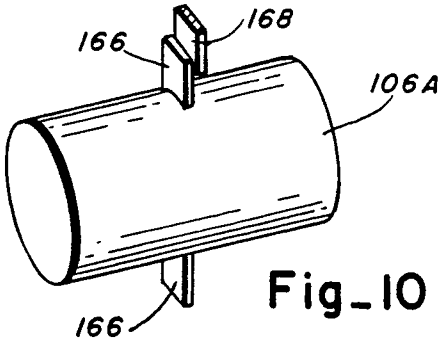
FIG. 10 is a perspective view, partically cut-away of the mechanism for sensing and controlling the positioning of the laminate as it is vertically indexed to each of the operating positions in the first wrapping station of the apparatus.

As shown in FIG. 10, means for indexing each laminate 12 through the various positions B-F in the first wrapping station 18 includes a pair of protrusions 166 mounted 180° apart on one of the shafts, for example shaft 106A, between the gears 100 of the indexing mechanism 90, and a proximity detector 168 positioned to detect the protrusion 166 every 180° rotation of the shaft 106A. In this regard the radius of each gear 100 is such that one-half the circumference of the gear, and thus the length of vertical travel of the chain 94, equals the length traveled by the laminate between each of the five succesive positions B-F in the wrapping station 18. The detector 168 is positioned so that the protusions 166 and proximity detector 168 provide an indication of when the laminate is in each of the five positions B-F.

When the laminate 12 is moved vertically down from position B to the position C of the first wrapping station 18, the first folding operation is simultaneously preferably performed at all four corners of the laminate, wherein (a) a first portion of part of the wrapper 14 at each corner is folded over the corresponding edge of the blank near the rounded corner and brought into contact with the top of the blank of the laminate in position C, while (b) a second portion of the part of the wrapper adjacent the first portion is lifted so as to keep the second portion from contacting the blank so that the second portion can be subsequently folded partially over and secured to part of the first portion to provide a nicely folded or tucked rounded corner. Means also are provided for performing the second folding operation, when the laminate moves from position C to the position D in FIG. 1.

Accordingly, each chain drive 92 includes means for simultaneously performing these first and second folding operations which preferably occurs as two laminates simultaneously move into the respective positions C and D. Specifically, referring to FIG. 11 each carrier chain drive 92 includes a cam 171 secured to and rotatable with the respective shaft 106A or 106B. A cam follower 172 includes the wheel 173 pivotably mounted to pivot about the pivot pin 174 (provided in a stationary support) and biased by the spring 175 so as to contact the cam surface of the cam 171. The arm 176 is rigidly secured at one end to and adapted to pivot with the cam follower 172 about the pin 174. The opposite end of the arm 176 is pivotably secured with the pivot pin 178 to one end of link 177. The link 177 is secured with the pivot pins 180 at an intermediate point and the other end of the link to intermediate points of two pivotable arms 179A and 179B. The latter are each pivotably mounted at an end about a pivot pin 181 to the support 170 (which is suitably fixed to the respective drive 92). The opposite end of each arm 179A and 179B is provided with a respective pressure wheel assemblies 182A and 182B for respectively performing the folding operations as the laminate moves into the corresponding positions C and D.

Figure 11:
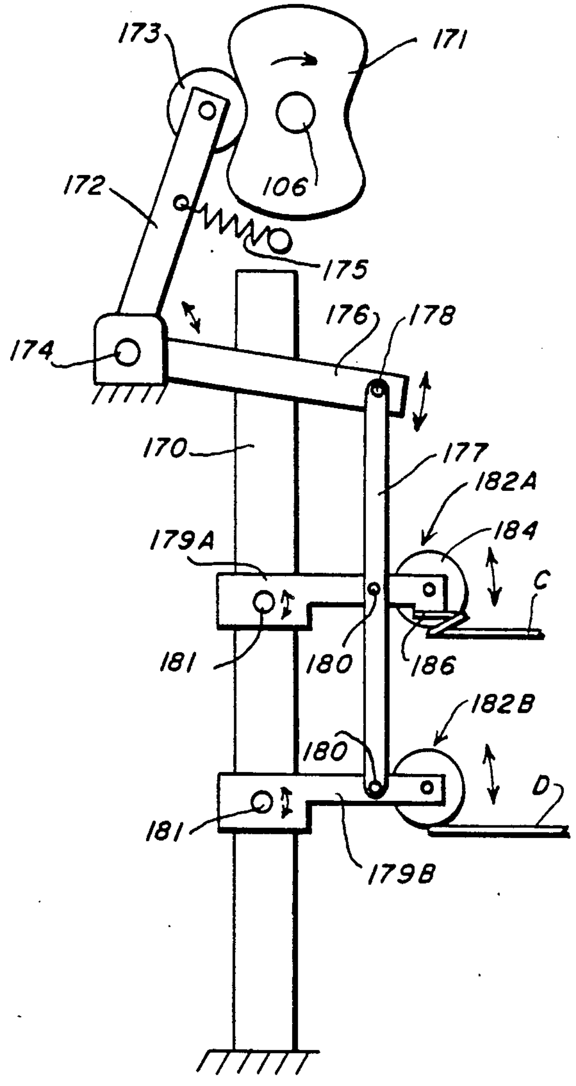
FIG. 11 is a side view of the preferred mechanism for folding and securing in two steps a part of the extended edge of the portion of the wrapper around the rounded corner of the blank.

The wheel assembly 182A at location C in station 18 is shown in FIG. 11 and in greater detail in FIGS. 13A and 14B, wherein the assembly comprises (1) wheel 184 rotatably secured to the end of the arm 179A and (2) a catch 186, preferably in the form of a blunted pointed blade extending from the end of the arm 179A, just below the axis of rotation of the wheel 184, but above the contact point of the wheel 184. The wheel 184 and the catch 186 are positioned relative to one another and extend out from the arm 179A a sufficient amount, such that, as shown in FIG. 11, as the shaft 106 rotates, the cam 171 will similarly rotate moving the cam follower 172 about the pivot pin 174, first against the bias of the spring 175 so as to tension the spring, and then with the bias of the spring so that the cam follower moves about pin 174 in the other rotational direction. As the follower moves back and forth about the pin 174, the arms 179A and 179B will alternatively pivot clockwise and counterclockwise about the respective pins 181 so as to (a) rotate the wheel assemblies 182A and 182B up and clear of the laminate as the latter moves from its previous position, (b) move the respective wheel 184 against and over the edge of the laminate catching a portion of the wrapper extending beyond the edge of the blank of the laminate as the laminate moves by and (c) move the respective wheel over a portion of the laminate as the latter arrives in the positions C and D. As the wheel assembly moves toward the edge of the laminate, the wheel 184 of the wheel assembly 182A in position C will rotate about the pivot pin 181 so that (1) not only will the wheel 184 catch a portion of the corresponding side edge of the wrapper 14 of the laminate 12 near the rounded corner, fold it over the edge of the blank 16, and press a portion of the edge of the wrapper 14 against the blank so that the adhesive on the portion of the folding strip which contacts the blank is secured against the blank, but (2) the catch 186 will push against the portion of the wrapper closer to the corner as the wrapper is folded over the edge by the wheel 184 so that a portion 302 of the wrapper edge adjacent that part being secured to the blank will be pushed forward and up so as to remain spaced and detached from the blank as the adjacent portion 300 (shaded in FIGS. 13A and 14B) is pressed against it by the wheel. This operation will be more evident from the description of FIGS. 13A-13E and 14A-14E. During this folding operation the wheel moves at a precise angle to the side edge of the laminate, e.g. 30°, as will more apparent hereinafter.

Figure 13A:
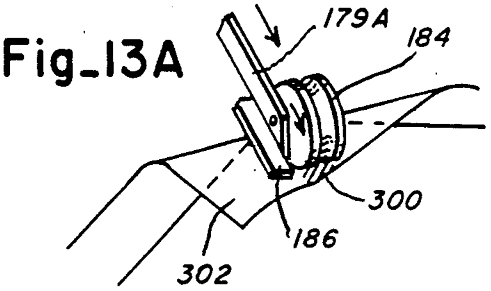
Figure 13B:
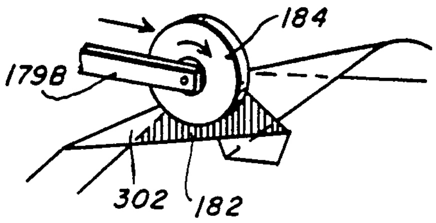

The wheel assembly 182B at the position D for performing the second folding operation when the laminate moves from position C to the position shown at D, is shown in FIGS. 13B and 14C. Wheel assembly 182B is identical to wheel assembly 182A, except that the catch 186 is omitted since it is not necessary. As best seen in FIGS. 13B and 14C the wheel 184 of assembly 182B used at position D will (1) catch the portion 302 of the corresponding leading and trailing edge of the wrapper of the laminate 12 near the rounded corner which was previously pushed by the catch 186, (2) fold it over the edge of the blank, and (3) press the portion 302 against the blank so that (a) the adhesive on the portion of the strip which contacts the blank is secured against the blank, and (b) the portion of the second fold 302 extends over the first fold 300. During this second folding operation at position D, the wheel 184 of the wheel assembly 182B moves at a precise angle to the corresponding leading or trailing edge of the laminate, e.g. 30°, and therefore at a 30° angle to the direction of the wheel 184 of the wheel assembly 182A at position C during the first fold, as will more apparent hereinafter.

Figure 13C:
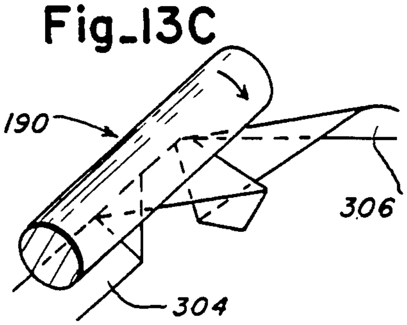

The first wrapping station 18 also includes means for folding the remaining portion 304 (as seen in FIG. 13C) of the leading and trailing edges 20 and 22 of the wrapper 12 at the next operating position, indicated at E in FIG. 1. The means for performing this folding operation includes a roller assembly 190, shown generally in FIG. 1, and more specifically in FIGS. 4 and 5, respectively positioned at opposite ends of the laminate 12, as the latter moves into the next operating position at E. Each roller assembly 190 preferably comprises a center, rotatably mounted shaft 192, secured between a corresponding pair of opposing chain drives 92A and 92C and between chain drives 92B and 92D. The center shaft 192 is mounted so as to rotate 180° in response to the control system 34 with each operation, as will be more evident hereinafter. The preferred roller assembly 190 includes two pairs of rollers, the pairs being mounted on diametrically opposite sides of the shaft 192. Each pair comprises rollers 194 and 196, respectively secured to rotate about their respective center rotation axes, so that the rotation axes of the rollers are substantially parallel to (1) one another, (2) the axis of the center shaft 192, and (3) the corresponding edge of the laminate with which the rollers engage. The top rollers are secured to rotate with the shaft 192 by any suitable means such as supports (one being shown at 194 in FIG. 5). One of the rollers, preferably the bottom roller 196 which engages the laminate, is a series of individually connected roller elements 199 (as best shown in FIG. 4), which are rotatably mounted on a pair of arms 200 (one being shown in FIGS. 4 and 5). The latter, in turn, are rotatably mounted on the shaft 192 and rotatably biased to the shaft by the tension spring 202 connected at one end to a pin 204 fixed to the shaft and at the other end to the arm 200. Spring 202 biases the roller elements 199 into engagement with the upper roller 198 of the pair so that the rollers 196 and 198 of each pair can separate against the force of the spring 200 as the rollers are moved over opposite sides of the laminate (of any thickness) when folding the corresponding leading or trailing wrapper edge over the blank, while at the same time exerting sufficient pressure so that the pressure sensitive adhesive on the wrapper edge sticks to the blank (see FIGS. 5 and 13C). The individual roller elements 199 are preferably connected to one another so that adjacent elements are capable of pivoting, at least through a limited angle, about the point of the intersection of the rotation axes of each pair of adjacent elements so joined, so as to accommodate any variations in thickness of the laminate as the rollers 196 and 198 engage the edge of the laminate.

As suggested in FIGS. 5 and 13C, as the laminate 12 moves from station D to station E, the roller assembly 190 rotates about the axis of the shaft 192 so that the top roller 198 engages the top of the remaining portion of the corresponding leading or trailing edge 20 or 22 of the wrapper 14 of the laminate 12 and begins to wrap it around the edge of the blank 16, while the bottom roller 196 engages the bottom of the laminate near the edge. As the laminate and roller assembly move relative to one another, the top roller 198 pushes the edge down on the blank against the action of the spring 200 so that the edge extends into and inbetween the two opposing rollers. This will result in the remaining portion of the wrapper at the leading and trailing edges being secured to the blank with the pressure sensitive adhesive. The use of the roller elements 199 of the lower roller 196 of the assembly 190 insures that the folding operation is performed relatively smoothly.

As shown in FIG. 1, when the folding operation is complete at position E, laminate 12 is ready to be moved to the next position in the wrapping station at position F. In this position the two clamps 124 and 126, holding the laminate at this position, begin to separate so that the laminate rests on the lower clamps 126 of the corresponding drives 92. Means, preferably in the form of kicking mechanism 210, is provided for moving the laminate out of the position F to the position G in the second wrapping station, generally indicated at 212, where the final folding operation occurs.

More specifically, as best shown in FIGS. 1 and 5, the mechanism 210 includes a pair of kicking bars 214 pivotably connected to a rotatable shaft 216, the latter being suitably rotatably mounted between the chain drives 92B and 92D, about an axis substantially parallel to the leading edge 20 of the laminate 12 in position F. Means are provided for pivoting the kicking bars 214 relatively quickly about the axis of shaft 216 through a limited angle so as to "kick" the laminate 12 off the clamps 126 toward the position G shown in FIG. 1. Preferably, the means for pivoting the bars 214 preferably includes at least one air cylinder 220 (shown in FIG. 5) suitably mounted to the system and having a piston rod 222 connected to a point on a corresponding bar 214 between the shaft 216 and the remote end of each bar. Providing pressurized air to the air cylinder will result in à relatively fast retraction of the piston rod 222 so that the kicking bars pivot quickly about the axis of shaft 216 through an angle sufficient to contact and move the laminate on the clamps 126 toward the position G, so that the laminate is capable of moving into this position. A proximity detector 224 is positioned so as to detect when the rod 222 of the air cylinder is completely retracted and the kicking bars 214 are at their furthest position so that the rod can be extended by the air cylinder and the bars 214 returned to their original position.

Figure 13D:
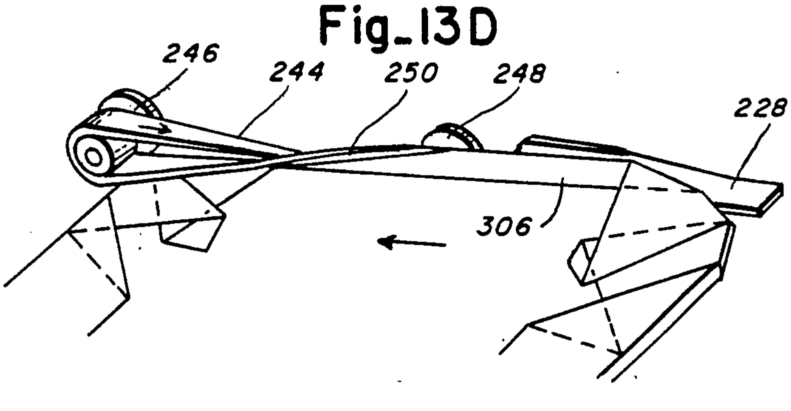
Figure 13E:
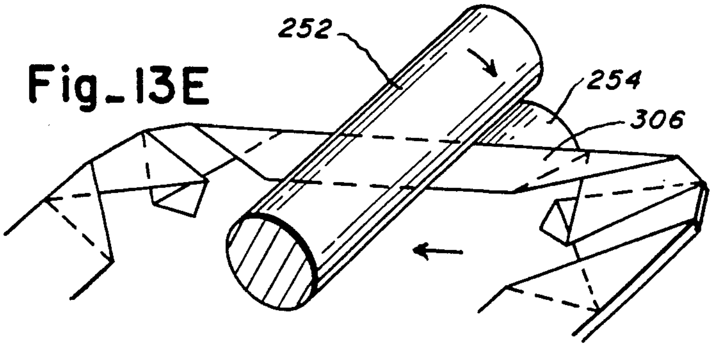

As shown generally in FIG. 1, and in greater detail in FIG. 13D, the apparatus includes means for wrapping the remaining portion 306 of the side edges 24 of the wrapper over the corresponding edges of the blank as the laminate is moved to position G of the second wrapping station 212.

More particularly, as shown in FIG. 13D the apparatus includes at least two pairs of opposing tracks 228 for guiding the laminate 12 as the kicking bars 214 push the laminate off the lower clamps 126 toward position G. Preferably, the means at the position G, for wrapping the remaining portions of the unfolded side edges 24 of the wrapper 14 over the corresponding edge of the blank 16, includes a pair of wrapping belts 244 mounted to fold the edge of the wrapper over onto the blank sufficiently as the laminate is moving through the position G so that pressure can be applied to the wrapped edges to secure them to the blank. As shown generally, in FIG. 1 and more specifically, in FIG. 13D, the wrapping belts are secured on opposite sides of the laminate as it moves through position G. Preferably, the belts are respectively mounted on two pairs of rollers 246 and 248. The rear rollers 246 are spaced apart by a distance less than that of the width of the blank, while the front rollers 248 are spaced apart by a distance greater than that of the width of the blank so that the belts will grip the laminate as they fold the side edges of the wrapper over the corresponding edges of the blank. Each wrapping belt 244 is secured to and movable over and under a corresponding roller 246 and then over and under a corresponding roller 248, whereupon each belt is twisted, as indicated at 250. As the laminate moves through the position G, each wrapping belt 244 will engage the remaining unwrapped side edge portion of the wrapper and fold it over the corresponding edge of the blank. As the laminate continues to move through position G, the moving wrapping belt 244 will wrap the side edges 24 of the laminate 12 over the edge of the blank 16.

Means, preferably in the form of pressure rollers 252 and 254 (see FIGS. 1 and 13E), are provided for pressing the edges down on the blank to insure that the edges are secure. The laminate then exits the system as a complete wrapped product, with the corners neatly and automatically wrapped while substantially preserving the roundness of the corner of the blank in the finished product.

It should be appreciated that the spacing between the two locating mechanisms 50 and the relative spacing between the individual vertically driven carrier chain drives 92 can be made adjustable to accommodate different sized laminates. For example, by mounting the mechanisms 50 and drives 92 on suitable mounting blocks and connecting the blocks with lead screws, the latter can be driven, for example, with a pair of stepping motors (one for each direction of relative movement of the blocks) so as to make the appropriate spatial adjustments.

The control system 34, shown in FIG. 12, includes suitable drive means, such as a drive motor 260. The drive motor 260 is coupled to suitable gearing 262, which in turn supplies the appropriate mechanical torque to pressure rolls 252 and 254, to side wrapping belts 244 and conveyor 30. Gearing 262 is also coupled to clutch 264, the latter being coupled to suitable gearing 266. Gearing 266 is coupled to camming mechanism 268 which operates roller assembly 190. Gearing 266 is also coupled to cam 171 through the shaft 106 for operating the wheel assemblies 182. Gearing 266 also drives the carrier chain drive 92. Proximity detector 168 indicates the position of the chain 94 and controls the operation of clutch 264 so that the latter is disengaged each time the detector 168 detects a protrusion 166 on the shaft 106. In addition detector 168 operates the air cylinder 220 so as to operate the kicking mechanism 210. Once operated the proximity detector 224 senses the extended position of the kicking mechanism and provides a feedback signal to the air cylinder so that the kicking mechanism is retracted.

Gearing 262 is also coupled to the clutch 270, which in turn couples the motor 260 and gearing 262 to the locating mechanism 50, and in particular shaft 58. Clutch 270 is engaged when the presence of a laminate 12 is sensed by detector 38 and disengaged when proximity detector 78 senses the protrusion 82 of the reference link 80 of the chain 52. Similarly, the detection by proximity switch 84 of the protrusion 82 of the reference link 80 (indicating the laminate is in position B and the gripping arms are clear of the carrier chain drives 92) results in the engagement of the clutch 264 coupling the gearing 262 to the gearing 266.

The foregoing will be more evident from a description of the operation of the system 10. Initially, the system is energized by the energization of the motor 260. In its initial condition conveyor 30 is in motion, clutch 270 is disengaged so that locating mechanism 50 is stopped, clutch 264 is disengaged so that the carrier chain 94 will not move, pressure rolls 252 and 254 are in motion, and wrapping belts 244 are in motion.

A laminate 12 enters the system 10 and is carried by the conveyor 30 toward position A. The unfolded wrapper edges and corners of the wrapper extend beyond the respective edges and corners of the blank, such as shown in FIG. 14A. When the laminate arrives at position A, detector 38 senses the presense of the laminate. Detector 38 provides a signal to clutch 270 so that the latter is engaged and the gearing 262 is coupled to the locating mechanism 50 so that the shaft 58 begins to rotate, driving the gripper chain 52. The gripping arms 68 and 70 grip the leading edge 20 of the laminate 12 in position A and carries it to position B. The gripper chain will continue to move as the reference link 80 moves by the proximity detector 84. The latter engages the clutch 264 so as to couple the gearing 262 to the gearing 266. The gripper chain will continue moving until the protrusion of the reference link 80 is sensed by the proximity detector 78, indicating that the next pair of gripping arms 68 and 70 are in position to receive the next laminate from conveyor 30, whereupon the chain 52 will stop moving, until the next laminate is sensed at position A. In this regard the rate at which laminates move into position A is slow enough so that the gripping arms will move into position to receive the next laminate before the next laminate reaches position A.

When the protrusion 82 of the reference link 80 moves by the proximity detector 84 and the clutch 264 is engaged so as to couple the gearing 262 to the gearing 266, the cam 171 and cam 268 rotate so that the wheel assemblies 182 and the roller assembly 190 are operated as previously described and shown in FIGS. 13A–13C, so as to successively fold the appropriate portions 300, 302 and 304 of the edge of the laminate as the latter moves into the respective positions C, D and E. See FIGS. 14A–14D. Gearing 266 thus synchronizes the movement of the wheel assemblies and the roller assembly. Rotation of the appropriate shaft 106C or 106D of the carrier results in the protrusions 166 being sensed by the proximity detector 168 every 180° rotation of the shaft. When the proximity detector 168 senses the protrusion, the detector 168 provides a signal so as to disengage the clutch 264 so as to stop chains 94 and stop a laminate, moving from position E, in position F. The signal from proximity detector 168 also is applied to the air cylinder 220 so as to activate the kicking mechanism 210 so as to move a laminate which has stopped in position F toward the second wrapping section 212 and the position G. When the kicking mechanism completes the movement to move the laminate toward position G, the proximity detector 224 will sense the kicking bars 214 and provide a signal to the air cylinder 220 so as to retract the rod of the cylinder, and thus retract the kicking bars of the mechanism to their original position. It should be appreciated that gearing 266 aids in synchronizing the wheel assemblies 182, roller assembly 190 and the carrier chain 94 of the carrier chain drives. The laminate is kicked onto guides 228 and into wrapping belts 244, where the remaining portions 306 of the side edges of the laminate are folded over the respective edges of the blank. See FIG. 14E.

System 10 is thus an improved system for tucking the edges and corners of a wrapper in a folded pattern around the corresponding edges and rounded corners of blank(s) secured to a wrapper in a neater fashion than achieved by the above described corner wrapping machine (which as described provides wrinkled folds), and in a more efficient and inexpensive manner than heretofore achieved by the hand assembly technique.

Since certain changes may be made in the above apparatus without departing from the scope of the invention herein involved, it is intended that all matter contained in the above description or shown in the accompanying drawings shall be interpreted in an illustrative and not in a limiting sense.

What is claimed is:

1. Apparatus for folding and securing the edges and corners of a relatively flexible, larger sheet over the corresponding edges and corners of at least one relatively rigid, smaller blank so as to substantially maintain the contour of the corners, wherein the blank includes at least one rounded corner and prior to folding and securing the edges and corners the sheet is provided with an adhesive coating on one side of the sheet, said one side of said sheet is secured to the blank so as to form a laminate, and the edges and corners of the sheet extend beyond the corresponding edges and corners of the blank, said apparatus comprising:

means for transporting said sheet and blank to a work station, wherein said sheet and blank are positioned at said work station as said laminate;

means for folding and securing a first portion of the part of said sheet over the edge of said blank near said rounded corner, while lifting a second portion of said part of said sheet adjacent said first portion so as keep said second portion from contacting said blank;

means for folding and securing said second portion of said part of said sheet over the corresponding portion of the edge of said blank near said rounded corner so that a part of said second portion covers at least a part of said first portion; and means for folding the remaining portions of the edges of said sheet over the corresponding edges of said blank.

2. Apparatus according to claim 1, wherein said means for transporting said sheet and blank to said work station includes laminate conveying means for conveying said laminate to a first position adjacent said work station, and gripping means for gripping said laminate at said first position and for moving said laminate into a second position at said work station.

3. Apparatus according to claim 2, wherein said means for transporting said sheet and blank to said work station includes means for sensing the presence of a laminate at said first position so as to control said laminate conveying means so as to insure said gripping means grips said laminate at said first position before said conveying means moves the next laminate into the first position.

4. Apparatus according to claim 3, wherein said means for sensing the presence of said laminate at said first position includes a source of radiation located so as to direct radiation toward said first position and a detector of said radiation positioned to detect a change in radiation at said first position generated by said source when a laminate is at said first position.

5. Apparatus according to claim 2, wherein said gripping means comprises at least two gears, at least one chain mounted for movement on said gears, means for driving said chain so that said chain moves on said gears, and means, connected to a select portion of said chain, for (1) gripping a laminate in said first position when said portion of said chain is positioned at a predetermined location on one of said gears and (2) releasing said laminate in said second position when said portion of said chain in positioned at a predetermined location on the other of said gears.

6. Apparatus according to claim 1, further including means, positioned at said work station, for moving said laminate to at least first and second locations, wherein said means for folding and securing said first portion of said part of said sheet folds and secures said first portion when said laminate moves into said first location; and said means for folding and securing said second portion of said part of said sheet folds and secures said second portion when said laminate moves into said second location.

7. Apparatus according to claim 6, wherein said means for folding and securing said first portion of the part of said sheet over the edge of said blank near said rounded corner includes a wheel, a catch, and means for moving said wheel and catch relative to said laminate as said laminate is moved into said first location such that said catch lifts said second portion of said part of said sheet as said wheel folds and secures said first portion of said part of said sheet over the edge of said blank.

8. Apparatus according to claim 7, wherein said means for folding and securing said first portion of the part of said sheet over the edge of said blank near said rounded corner includes means for supporting said wheel and catch in a predetermined relationship with one another.

9. Apparatus according to claim 8, wherein said catch includes a blunt blade, and said means for supporting said wheel and catch includes means for supporting said blade adjacent said wheel.

10. Apparatus according to claim 6, wherein said means for folding and securing said second portion of the part of said sheet over the edge of said blank near said rounded corner includes a wheel, and means for moving said wheel relative to said laminate as said laminate is moved into said second location such that said wheel folds and secures said second portion of said part of said sheet over the edge of said blank.

11. Apparatus according to claim 10, wherein said means for folding and securing said first portion of the part of said sheet over the edge of said blank near said rounded corner includes a wheel, a catch, and means for moving said wheel and catch relative to said laminate as said laminate is moved into said first location such that said catch lifts said second portion of said part of said sheet as said wheel folds and secures said first portion of said part of said sheet over the edge of said blank.

12. Apparatus according to claim 11, wherein said means for folding and securing said first portion of the part of said sheet over the edge of said blank near said rounded corner includes means for supporting said wheel and catch in a predetermined relationship with one another.

13. Apparatus according to claim 12, wherein said catch includes a blunt blade, and said means for supporting said wheel and catch includes means for supporting said blade adjacent said wheel.

14. Apparatus according to claim 6, wherein said means for transporting said sheet and blank to said work station includes (1) laminate conveying means for conveying said laminate to a first position adjacent said work station, and (2) first gripping means for gripping said laminate at said first position and for moving said laminate into a second position at said work station, wherein said means for moving said laminate to said first and second locations includes means for receiving said laminate in said second position and for moving said laminate from said second position to said first and second locations.

15. Apparatus according to claim 14, wherein said means for moving said laminate through said first and second locations includes second gripping means for for (1) receiving said laminate in said first position and (2) moving said laminate from said second position to said first and second locations.

16. Apparatus according to claim 15, wherein said second gripping means includes at least two gears, at least one chain mounted for movement on said gears, means for driving said chain so that said chain moves on said gears, and means, connected to a select portion of said chain, for (1) receiving a laminate in said second position from said first gripping means when said select portion is positioned on a preselected portion of one of said gears, and (2) gripping said laminate and moving said laminate to said first and second locations as said laminate is moved from said one gear to the other one of said gears.

17. Apparatus according to claim 6, wherein laminate has four edges, said means for moving said laminate moves said laminate to a third location, and said means for folding the remaining portions of the edges of said sheet includes means for folding and securing the remaining portions of at least two opposite edges of said sheet over the corresponding edges of said blank when said laminate moves into said third location.

18. Apparatus according to claim 17, wherein said means for folding the remaining portions of at least two opposite edges of said sheet includes at least one pair of rollers for each of said two opposite edges and means for positioning said rollers so that the remaining portions of the two opposite edges of said sheet interacts with a corresponding pair of said roller so that each said remaining portion of said sheet is folded over the corresponding edge of said blank and the edge of said laminate inserted between said pair of rollers so as to secure each said remaining portion to the blank.

19. Apparatus according to claim 18, wherein said means for folding the remaining portions of at least two opposite edges of said sheet includes means or moving each of said pairs of rollers as said laminate moves from said second location to said third location such that said pairs of rollers folds and secures said two opposite edges as said laminate moves to said third location.

20. Apparatus according to claim 17, wherein said means for transporting said sheet and blank to said work station includes (1) laminate conveying means for conveying said laminate to a first position adjacent said work station, and (2) first gripping means for gripping said laminate at said first position and for moving said laminate into a second position at said work station, wherein said means for moving said laminate to said first, second and third locations includes means for receiving said laminate in said second position and for moving said laminate from said second position to said first, second and third locations.

21. Apparatus according to claim 20, wherein said means for moving said laminate to said first, second and third locations includes second gripping means for for (1) receiving said laminate in said first position and (2) moving said laminate from said second position to said first, second and third locations.

22. Apparatus according to claim 21, wherein said second gripping means includes at least two gears, at least one chain mounted for movement on said gears, means for driving said chain so that said chain moves on said gears, and means, connected to a select portion of said chain, for (1) receiving a laminate in said second position from said first gripping means when said select portion is positioned on a preselected portion of one of said gears, and (2) gripping said laminate and moving said laminate to said first, second and third locations as said laminate is moved from said one gear to the other one of said gears.

23. Apparatus according to claim 17, wherein said means for moving said laminate includes means for moving said laminate to a fourth location, and said means for folding the remaining portions of the edges of said sheet includes means, at said fourth location, for folding the remaining portions of the other two edges of said laminate.

24. Apparatus according to claim 23, wherein said means for moving said laminate to said first, second and third locations includes means for releasing said laminate at a fifth location, said means for moving said laminate further includes means moving said laminate from said fifth location to said fourth location.

25. Apparatus according to claim 24, wherein said means for moving said laminate from said fifth location to said fourth location includes means for changing the direction of said laminate.

26. Apparatus according to claim 23, wherein said means for folding the remaining portions of the other two edges of said laminate includes (1) a pair of twisted belts and means, mounted relative to the direction of travel of said laminate as said laminate moves to said fourth location so that said belts interact with said laminate so as to fold said remaining portions of the other two edges of said laminate, and (2) means for securing said remaining portions of the other two edges of said laminate.

27. Apparatus according to claim 26, wherein said means for securing said remaining portions of the other two edges of said laminate includes a pair of rollers mounted so as to receive said laminate therebetween in said fourth location.

* * * * *

UNITED STATES PATENT AND TRADEMARK OFFICE
CERTIFICATE OF CORRECTION

PATENT NO. : 4,701,238
DATED : October 20, 1987
INVENTOR(S) : Ronald H. Boucher

It is certified that error appears in the above-identified patent and that said Letters Patent is hereby corrected as shown below:

Claim 1, column 17, line 2, after "as" insert -- to --;
Claim 5, column 17, line 44, delete "in" and insert -- is --;
Claim 15, column 18, line 48, delete "for";
Claim 17, column 18, line 64, after "wherein" insert -- said --;
Claim 18, column 19, line 10, delete "roller" and insert -- rollers --;
Claim 19, column 19, line 17, delete "or" and insert -- for --;
Claim 19, column 19, line 20 delete "pairs" and insert -- pair --; and
Claim 21, column 19, line 36, delete "for", second occurrence.

Signed and Sealed this

Fifteenth Day of March, 1988

*Attest:*

DONALD J. QUIGG

*Attesting Officer*

*Commissioner of Patents and Trademarks*